3,504,048
HYDROCARBON SEPARATION PROCESS
Armand J. de Rosset, Clarendon Hills, Ill., assignor to Universal Oil Products Company, Des Plaines, Ill., a corporation of Delaware
No Drawing. Filed Apr. 5, 1968, Ser. No. 719,245
Int. Cl. C07c 7/02
U.S. Cl. 260—674                                    6 Claims

ABSTRACT OF THE DISCLOSURE

A membrane permeation separation process which involves the separation of para- and meta-xylene isomers. A mixture of para- and meta-xylene is contacted with a selected polymer membrane which through selective permeation enriches the material passing through the membrane in para-xylene.

BACKGROUND OF INVENTION

This invention relates to the separation of hydrocarbons of substantially similar boiling points through the use of a membrane which selectively enriches the hydrocarbons permeating the membrane in one component. More specifically this invention relates to the use of a thin polymer membrane to effect the enrichment of a hydrocarbon stream permeating the membrane.

SUMMARY OF THE INVENTION

It is an object of this invention to separate hydrocarbons not ordinarily separable by fractionation techniques in that the hydrocarbons have substantially similar boiling points. It is a further object of this invention to separate similar boiling hydrocarbons using a thin polymer membrane which selectively enriches a hydrocarbon stream in one component thereby effecting a separation by selective diffusion through the membrane.

Present demands for xylenes and in particular para- and meta-xylene in purified forms have placed emphasis on processes to separate these two isomers. The ortho-, meta- and para-xylene isomers are presently produced in large quantities in reforming processes. Generally the orthoxylene isomer can be removed from a mixture of the third isomers by way of fractionation leaving a stream containing para- and meta-xylene. The closeness of boiling points of the para- and meta-xylenes precludes separation into individual enriched streams by fractionation methods. Present methods of xylene separation include fractional crystallization, clathration, adsorption and diffusion operations.

The thin membrane used in the process of this invention was a homogeneous film which was thermoplastic. The structure of the polymer membrane was substantially free from cross linking of the long chains making up the film and comprised a linked combination of para-xylene connected in an orderly fashion by the methyl groups of the para-xylene. Thus in describing the membrane used in the process of this invention it can be said that the polymer chains are para-xylene structure material connected in a head to tail manner giving a long and repeating polymeric composition. The polymer as thus described can be modified by substitution of components on the aromatic nucleus.

In experiments conducted to indicate the operability of the process of this invention two separate chambers were connected in a fashion that the membrane used for the permeation structures was to separate the two chambers into a feed zone and a diffusate zone. The membrane was installed between the two zones or chambers in a manner that prevented material in either zone to enter the other zone unless those materials permeated the membrane.

The feed zone contained an inlet port through which a feed mixture of known composition was injected into the feed zone and a sample port through which a sample of the feed vapor could be taken for analysis when required. The diffusate zone was similarly constructed containing two ports. Through one port a carrier or sweep gas was passed and through the other port the carrier gas which contained permeated vapor was removed. The carrier gas exiting from the diffusate zone was analyzed as required to determine the composition of the permeated mixture.

The feed vapors and the permeated mixture vapors were analyzed using a chromatographic column suitably prepared for the required analysis. The permeated gas vapors were more concentrated in para-xylene than the feed vapors. In determining the selectivity of a membrane by measuring the competitive permeation of selected components the following definition of selectivity is used hereinafter:

$$\text{Selectivity (B)} = \frac{\frac{N}{1-N}}{\frac{n}{1-n}}$$

where N is the volume fraction of the selected component in the permeated vapor present in the diffusate zone and n is the volume fraction of the same selected component present in the non-permeated vapor present in the feed zone.

In one experiment a polymer membrane about 3 mils (0.003 inch) thick, substantially free of cross linking comprising long chains of para-xylene structure material connected by the alkyl groups of the xylene structure was used to selectively enrich a permeated vapor stream in paraxylene. The membrane polymer used in this experiment contained no substitution products on the aromatic ring. The membrane was placed between the two chambers used and sealed to prevent leakage of feed around the membrane into the diffusate zone and the membrane were kept at essentially constant temperature by immersing them in a constant temperature water bath.

Samples taken from both the feed and diffusate zones at periodic intervals were analyzed and a selectivity of the competitive permeation of para-xylene with respect to meta-xylene gave a value of about 1.3. The average diffusate zone permeated vapor composition was about 54.5 volume percent para-xylene and about 45.5 volume percent meta-xylene.

In a similar fashion a membrane which had at least one halogen substituted product attached to the aromatic ring of the polymer was used to selectively enrich the diffusate zone in para-xylene. The average diffusate zone permeated vapor composition was about 54.8 volume percent para-xylene and about 45.2 volume percent. The selectivity of this membrane for para-xylene separation was calculated to be about 1.2.

In operation of the process in a continuous manner the feed entering the feed zone is contacted with the selected membrane to allow permeation of a portion of the feed through the membrane. The feed mixture not permeating the membrane is withdrawn from the feed zone enriched in the less selectively permeated component of the feed. It is contemplated that a series of membranes may be arranged in a staged manner to effect a further enrichment of both the feed and permeated vapors. Arrangement of the stages and the manner of feed introduction and permeated vapor withdrawal are left as being familiar to those skilled in the art of this nature of separation. It is contemplated that the membrane used in this process can be supported where large pressure differentials are imposed between the feed and diffusate zones. Sintered metal, glass or fine screens may be used to support the membrane where the membrane by itself is not able to withstand the pressure differentials imposed upon it.

It is preferred that the permeation conditions for operation of this invention include a temperature within a range of from about 30° C. to about 150° C. and more preferably within the range of from about 50° C. to about 90° C. It is also preferred that the pressure drop across the thin membrane be less than about 10 p.s.i. and the pressure that the feed zone is operated at is within a range of from about 0 p.s.i.g. to about 25 p.s.i.g.

DESCRIPTION OF PREFERRED EMBODIMENTS

A broad embodiment of the present invention resides in a process of separating a feed mixture of at least two similar boiling temperature alkyl substituted aromatic hydrocarbons in which the feed mixture, in liquid or vapor phase, is contacted with a thin homogeneous membrane of essentially poly-para-xylene linked structure in a feed zone at permeation conditions to effect permeation of said mixture through said membrane to a diffusate zone which is separated from the feed zone by said membrane, removing the permeated portion of said mixture which is enriched in at least one component of the feed from the diffusate zone, and withdrawing from the feed zone at least a portion of the non-permeated feed mixture.

What is claimed is:

1. A process of separating a feed mixture of at least two similar boiling temperature alkyl substituted aromatic hydrocarbons in which the feed mixture is contacted with a thin homogeneous membrane of essentially poly-para-xylene linked structure in a feed zone at permeation conditions to effect permeation of said mixture through said membrane to a diffusate zone which is separated from the feed zone by said membrane, removing the permeated portion of said mixture which is enriched in at least one component of the feed from the diffusate zone, and withdrawing from the feed zone at least a portion of the non-permeated feed mixture.

2. The process of claim 1 further characterized in that at least a portion of the feed mixture introduced into the feed zone is a vapor.

3. The process of claim 1 further characterized in that said permeation conditions include a temperature within the range of from about 30° C. to about 150° C. and a pressure within the range of from about atmospheric to about 25 p.s.i.g.

4. The process of claim 1 further characterized in that said feed comprises meta- and para-xylene.

5. The process of claim 1 further characterized in that said membrane is a polymer substantially free of crosslinking, containing therein repeating structures of para-xylene.

6. The process of claim 5 further characterized in that said repeating structures are connected by the alkyl groups of said para-xylene structures.

References Cited

UNITED STATES PATENTS

| | | | |
|---|---|---|---|
| 3,149,175 | 9/1964 | Pollart | 260—668 |
| 3,320,328 | 5/1967 | Michaels | 260—674 |

DELBERT E. GANTZ, Primary Examiner

C. E. SPRESSER, Assistant Examiner

U.S. Cl. X.R.

208—290